United States Patent [19]

Tabushi et al.

[11] 3,928,480

[45] Dec. 23, 1975

[54] PROCESS OF PRODUCING ALKYL ADAMANTANES

[75] Inventors: Iwao Tabushi, Fukuoka; Koji Fukunishi, Kyoto, both of Japan

[73] Assignee: Idemitsu Kosan Co., Ltd., Tokyo, Japan

[22] Filed: Nov. 25, 1974

[21] Appl. No.: 527,049

[52] U.S. Cl............................................. 260/666 M
[51] Int. Cl.$^2$......................................... C07C 13/28
[58] Field of Search ............................. 260/666 M

[56] References Cited
UNITED STATES PATENTS 3,336,405   8/1967   Schneider et al. ............. 260/666 M
3,671,600   6/1972   Moore ............................ 260/666 M Primary Examiner—Herbert Levine
Assistant Examiner—G. J. Crasanakis
Attorney, Agent, or Firm—Flynn & Frishauf

[57] ABSTRACT

Alkyl adamantane is obtained by reacting adamantane compound with olefin in the presence of free radical initiator. Alkyl adamantanes are lubricants, and intermediates for preparation of oil additives, antirust agents, insecticides, etc.

16 Claims, No Drawings

PROCESS OF PRODUCING ALKYL ADAMANTANES

BACKGROUND OF THE INVENTION

1. Field of the Invention

The present invention relates to a process of producing alkyl adamantanes, and more particularly to a process of producing alkyl adamantanes by reacting an adamantane compound with an olefin in the presence of a free radical initiator.

2. Description of the Prior Art

Various methods for introducing substituent groups to an adamantane can be considered as shown below: (1) replacement reaction, where an adamantyl cation prepared by direct electrophilic (cationoid) attack to an adamantane combines with an anion; (2) replacement reaction, in which an atom or an atomic group transfers between a chain carrier or a chain transfer reagent and an adamantyl radical prepared by direct radical attack; (3) replacement reaction by direct insertion reaction of a bivalent reactive intermediate such as a carbene or a nitrene; (4) ring formation by condensation among appropriate components having substituent groups. For instance, bromination by $Br_2$ (substituent at the position 1 or bridgehead is obtained exclusively) and formation of a carboxylic acid by formic acid are examples of method (1), and chlorination and alcohol synthesis by autoxidation are known examples of method (2).

As to alkylation of an adamantane compound by an olefin, (i) the reaction of 1-adamantyl bromide with an olefin in the presence of a Lewis acid, and (ii) the reaction of adamantanol with an olefin in the presence of a Lewis acid are known. However, these Friedel-Crafts type reactions contain intrinsic disadvantages, such as requirement of large amounts of Lewis acid catalyzing the reaction, impossibility of obtaining a compound possessing a long chain alkyl group, isomerization of an alkyl group, substitution of an alkyl group into more than one position in attempting to improve reaction yield.

SUMMARY OF THE INVENTION

It is an object of this invention to provide a process of producing an alkyl adamantane.

According to this invention, an alkylation product is influenced by the kind of olefin used. That is to say, when ethylene or propylene is used, a 1—1 adduct as well as a product with a longer chain alkyl group due to telomerization are obtained. And when other olefins are used, a 1—1 adduct is obtained almost exclusively.

DESCRIPTION OF THE PREFERRED EMBODIMENTS

The present invention relates to a process of producing an alkyl adamantane. More particularly, this invention relates to a process of producing an alkyl adamantane by reacting an adamantane compound with an olefin in the presence of a free radical initiator.

In the present invention, the term "adamantane compound" means non-substituted and substituted adamantanes. Among substituted adamantanes, those having more reactive electron-attracting groups to radicals, which are generated from radical initiators, than hydrogen at the bridgehead (e.g., nitro-, bromo-, amino-, aldehyde- or mercapto-groups) are less desirable for the reaction, because they bring about a decrease in reaction yield.

Olefins used herein include alkenes, cyclo-olefins, unsaturated carboxylic acids and their derivatives. Examples of such compounds are ethylene, propylene, butene, pentene, hexene, heptene, octene, cyclopentene, cyclohexene, cyclooctene and methyl acrylate. $\alpha$-olefins are generally favorable for the reaction.

Radical initiators employed in the present invention include inorganic and organic peroxides, for example hydrogen peroxide, potassium persulfate, ammonium persulfate, aromatic diacyl peroxides such as benzoyl peroxide and its substituents, aliphatic diacyl peroxides such as lauroyl peroxide and acetyl peroxide, hydroperoxides such as cumene hydroperoxide and t-butyl hydroperoxide, dialkyl peroxides such as di-t-butylperoxide, and ketone peroxides such as methyl ethyl ketone peroxide. Radical initiators also include azo compounds, for example azo-bis-nitriles such as 2,2'-azo-bis-isobutyl nitrile and 2,2'-azo-bis-propionitrile, diazo-aminobenzene, nitroso-acyl-allylamines, azo-thioethers and p-nitro-benzene diazoniums. They also include redox initiators composed of the aforementioned initiators and promoters of the reaction.

Conditions for alkylation of an adamantane compound such as reaction temperature and reaction period depend on the kind of free radical initiator, amounts thereof and other factors. For instance, when benzoyl peroxide is used, the reaction is normally performed at 60°–90°C. for 2–3 hours, while the reaction is performed at 110°–150°C. for 1–5 hours using di-t-butyl-peroxide. Generally, a reaction temperature of from about 60° to 150°C. and a reaction time of from about 1 to about 5 hours are satisfactory.

In radical alkylation of the present invention, it is confirmed that the withdrawing rate of hydrogen in an adamantane compound is large as compared with C-H in other compounds, and selectivity of the withdrawing hydrogen of an adamantane compound at positions 1 and 2 depends greatly on steric conformation of attacking radicals; namely, bulky radicals showed more selective pulling of hydrogen at the position 1. Moreover, transfer of an adamantyl radical to the position 2 from 1 is negligible. Products of alkylation vary with olefins used. Namely, when ethylene or propylene is used, a 1—1 adduct as well as a product with a longer chain alkyl group due to telomerization is obtained. And when other olefins are used, a 1—1 adduct is obtained, almost exclusively.

EXAMPLE 1

A mixture comprising 13.6 g. (0.1 mole) of adamantane, 0.73 g. (5 millimoles) of di-t-butyl-peroxide and 50 ml. of benzene was placed in a 100 ml. autoclave, and then air was displaced by ethylene. Ethylene pressure was set at 5 kg./cm.$^2$, 10 kg./cm.$^2$ and 20 kg./cm.$^2$ and the reaction was performed at 150°C. for 2 hours. After the reaction was completed, the reaction product was distilled at reduced pressure or by gas chromatography, and products shown in Table 1 were obtained.

Table 1

| | Pressure of ethylene (kg./cm.$^2$) | | |
|---|---|---|---|
| | 5 | 10 | 20 |
| Adamantane: | | | |
| amounts used (g.) | 13.65 | 13.61 | 13.65 |
| amounts recovered (g.) | 11.63 | (a) | (a) |
| Products: | | | |

Table 1-continued

|  | Pressure of ethylene (kg./cm.²) | | |
| --- | --- | --- | --- |
|  | 5 | 10 | 20 |
| 1-ethyladamantane (g.) | 1.18 | 0.58 | 0.25 |
| 1-n-butyladamantane (g.) | 0.46 | 0.51 | 0.33 |
| 1-n-hexyladamantane (g.) | — | 0.034 | 0.051 |

(a): Unreactive compounds were recovered quantitatively.

EXAMPLE 2

A mixture comprising 16.435 g. (0.1 mole) of 1,3-dimethyladamantane and 0.730 g. (5 millimoles) of di-t-butyl-peroxide was placed in a 100 ml. autoclave. After air was displaced by ethylene, ethylene pressure was set at (1) 2 kg./cm.², (2) 5 kg./cm.² and (3) 10 kg./cm.² and then the mixture was reacted at 130°C. for 5 hours with stirring. After cooling, reaction products were isolated by distillation at reduced pressure or gas chromatography. Results were shown in Table 2.

Table 2

|  | Pressure of ethylene (Kg./cm.²) | | |
| --- | --- | --- | --- |
|  | 2 | 5 | 10 |
| Conversion of dimethyladamantane (%) | 22.5 | 29.6 | 25.3 |
| Products |  | Yield* (mole %) |  |
| 1-ethyl-3,5-dimethyl-adamantane (n=1) | 89.0 | 69.7 | 33.5 |
| 1-butyl-3,5-dimethyl-adamantane (n=2) | 10.5 | 17.0 | 23.9 |
| 1-hexyl-3,5-dimethyl-adamantane (n=3) | 0.5 | 1.8 | 4.8 |
| 1-octyl-3,5-dimethyl-adamantane (n=4) | 0 | 0.4 | 1.1 |
| (n ≧ 5) | — | — | — |

*Yield was calculated on the basis of dimethyladamantane consumed.
n=degree of polymerization of $C_2H_4$

EXAMPLE 3

A mixture of 1,3-dimethyladamantane, olefin and di-t-butyl-peroxide was placed in a flask and reacted at 150°C. for 5 hours. Reaction products were analyzed by gas chromatography. The products are shown in Table 3.

Table 3

| 1-1 Adduct (R) | Olefin Used | Molar ratio[a] | Yields of 1-1 adduct[b] | Yields of Olefin dimer[b] |
| --- | --- | --- | --- | --- |
| —$C_6H_{13}$ | Hexene-1 | 1 | 9 | 0 |
|  |  | 10 | 20 | 0 |
| —$C_8H_{17}$ | Octene-1 | 5 | 15 | 0 |
|  |  | 10 | 17 | 0 |
| —$C_6H_{11}$[c] | Cyclohexene | 10 | 5 | 9 |
| —$C_8H_{15}$[c] | Cyclooctene | 5 | 15 | 1 |
|  |  | 10 | 26 | 2 |

[a]dimethyladamantane/olefin
[b]yields were determined based upon the converted olefins.
[c]cyclo Alkyl adamantanes thus obtained can be used as intermediates for organic synthesis, for example 1-n-hexyl or 1-n-octyl adamantane is utilized for the synthesis of carboxylic acids which are useful as oiliness additives. The corresponding alkali salts, e.g., calcium salt or magnesium salt, are useful as antirust agents. Further, an alkyl adamantane can be oxidized to adamantanol. An ester obtained by esterifying said adamantanol with phosphoric acid or sulfuric acid is utilized as a hydraulic oil.

Furthermore, an alkyl adamantane itself can be utilized as a lubricant and alkyl adamantane derivatives are utilized as insecticides and medicines for influenzae.

What is claimed is:

1. A process of producing an alkyl adamantane which comprises reacting an adamantane compound with an olefin in the presence of a free radical initiator.

2. The process according to claim 1, wherein the free radical initiator is one selected from the group consisting of hydrogen peroxide, potassium persulfate, ammonium persulfate, benzoyl peroxide, lauroyl peroxide, acetyl peroxide, cumene hydroperoxide, t-butyl hydroperoxide, di-t-butyl peroxide, methyl ethyl ketone peroxide, 2,2'-azo-bis-isobutyl nitrile, 2,2'-azo-bis-propionitrile, diazo-amino benzene, nitroso-acyl-allylamines, azo-thio-ethers and p-nitrobenzene diazonium.

3. The process according to claim 1, wherein the free radical initiator is di-t-butyl peroxide.

4. The process according to claim 1, wherein the adamantane compound is one selected from the group consisting of adamantane and 1,3-dimethyl adamantane.

5. The process according to claim 1, wherein the olefin is one selected from the group consisting of ethylene, propylene, butene, pentene, hexene, heptene, octene, cyclopentene, cyclohexene, cyclooctene and methyl acrylate.

6. The process according to claim 1, wherein adamantane, ethylene and di-t-butyl peroxide are used as the adamantane compound, the olefin and the free radical initiator, respectively.

7. The process according to claim 1, wherein 1,3-dimethyl adamantane, ethylene and di-t-butyl peroxide are used as the adamantane compound, the olefin and the free radical initiator, respectively.

8. The process according to claim 1, wherein 1,3-dimethyl adamantane, hexene-1 and di-t-butyl peroxide are used as the adamantane compound, the olefin and the free radical initiator, respectively.

9. The process according to claim 1, wherein 1,3-dimethyl adamantane, octene-1 and di-t-butyl peroxide are used as the adamantane compound, the olefin and the free radical initiator, respectively.

10. The process according to claim 1, wherein 1,3-dimethyl adamantane, cyclohexene and di-t-butyl peroxide are used as the adamantane compound, the olefin and the free radical initiator, respectively.

11. The process according to claim 1, wherein 1,3-dimethyl adamantane, cyclooctene and di-t-butyl peroxide are used as the adamantane compound, the olefin and the free radical initiator, respectively.

12. The process according to claim 6, wherein the reaction is carried out at a temperature of 110° to 150°C. for 1 to 5 hours.

13. The process according to claim 7, wherein the reaction is carried out at a temperature of 110° to 150°C for 1 to 5 hours.

14. The process according to claim 8, wherein the reaction is carried out at a temperature of 110° to 150°C. for 1 to 5 hours.

15. The process according to claim 10, wherein the reaction is carried out at a temperature of 110° to 150°C. for 1 to 5 hours.

16. The process according to claim 11, wherein the reaction is carried out at a temperature of 110° to 150°C. for 1 to 5 hours.

* * * * *

Disclaimer 3,928,480.—*Iwao Tabushi*, Fukuoka, and *Koji Fukunishi*, Kyoto, Japan. PROCESS OF PRODUCING ALKYL ADAMANTANES. Patent dated Dec. 23, 1975. Disclaimer filed May 4, 1976, by the assignee, *Idemitsu Kosan Co., Ltd.*

Hereby enters this disclaimer to claims 1 through 16 of said patent.

[*Official Gazette July 6, 1976.*]